US010545272B2

(12) United States Patent
Clerc et al.

(10) Patent No.: US 10,545,272 B2
(45) Date of Patent: *Jan. 28, 2020

(54) TINTED POLARIZING OPTICAL ELEMENT AND METHOD FOR MANUFACTURING SUCH AN ELEMENT

(71) Applicant: BNL Eurolens, Bellegarde sur Valserine (FR)

(72) Inventors: Didier Clerc, Eloise (FR); Franck Ledien, Echallon (FR)

(73) Assignee: BNL Eurolens, Bellegarde sur Valserine (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/971,068

(22) Filed: May 4, 2018

(65) Prior Publication Data

US 2018/0252853 A1 Sep. 6, 2018

Related U.S. Application Data

(62) Division of application No. 14/342,927, filed as application No. PCT/EP2012/067231 on Sep. 4, 2012, now Pat. No. 9,989,686.

(30) Foreign Application Priority Data

Sep. 6, 2011 (FR) .................................... 11 02704

(51) Int. Cl.
*G02B 5/30* (2006.01)
*B29D 11/00* (2006.01)
(Continued)

(52) U.S. Cl.
CPC ........ *G02B 5/3033* (2013.01); *B29C 45/1671* (2013.01); *B29D 11/0073* (2013.01);
(Continued)

(58) Field of Classification Search
CPC .. G02B 5/3033; G02B 1/043; B29C 45/1671; B29D 11/00644; B29D 11/0073;
(Continued)

(56) References Cited

U.S. PATENT DOCUMENTS 5,149,183 A 9/1992 Perrott et al.
5,413,971 A 5/1995 McPherson
(Continued)

FOREIGN PATENT DOCUMENTS

EP 0 940 244 A2 9/1999
EP 1 193 044 A2 4/2002
(Continued)

OTHER PUBLICATIONS

Notice of Allowance dated Jun. 22, 2018 for U.S. Appl. No. 15/012,241; 7 pages.
(Continued)

*Primary Examiner* — Wen Huang
(74) *Attorney, Agent, or Firm* — Daly, Crowley, Mofford & Durkee, LLP

(57) ABSTRACT

A tinted polarizing optical element includes a pre-manufactured polarizing optical assembly. The polarizing optical assembly includes a first layer provided from a thermoplastic or a thermosetting material; a second layer consisting of a polarizing film; and a third layer provided from a thermoplastic or a thermosetting material, wherein the second layer consisting of the polarizing film is disposed between the first layer and the third layer. The optical element further includes a fourth layer provided from a tinted thermoplastic material, which is disposed over the polarizing optical assembly such that the fourth layer is spaced apart from the polarizing film by at least one layer. The tint of the fourth layer is obtained independently from the polarizing optical assembly. The optical element also includes a fifth layer
(Continued)

Figures 1, 2:
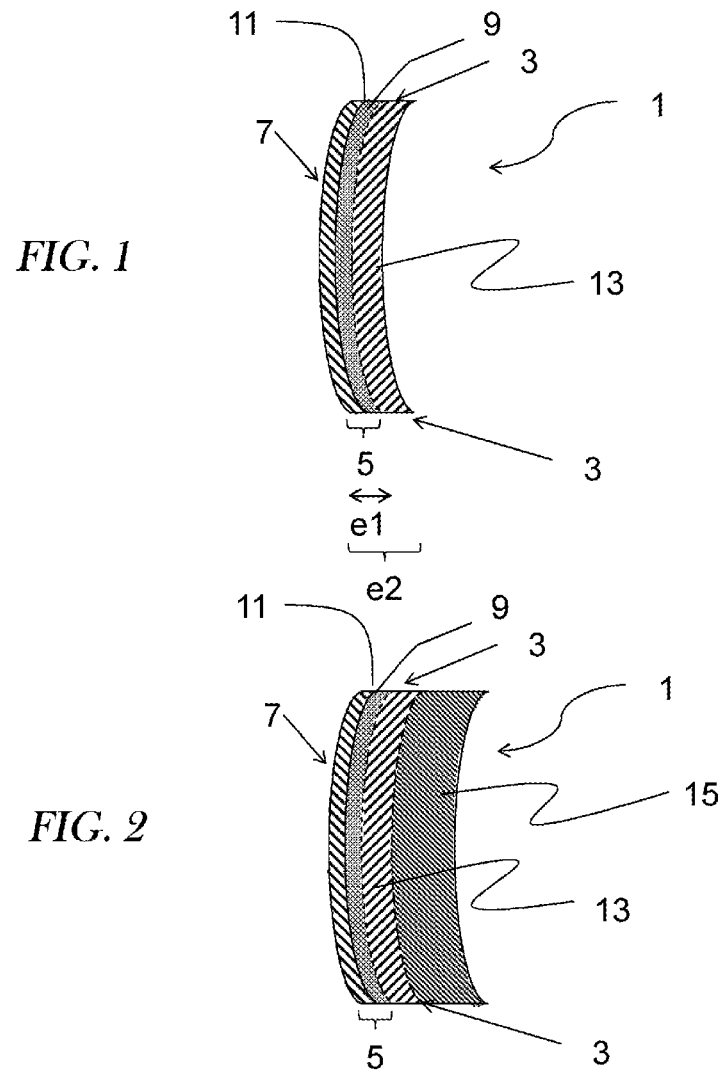

provided from a crystal thermoplastic material, which has a finished surface to provide a corrective effect.

22 Claims, 2 Drawing Sheets

(51) Int. Cl.
G02B 1/04 (2006.01)
G02C 7/02 (2006.01)
G02C 7/10 (2006.01)
G02C 7/12 (2006.01)
B29C 45/16 (2006.01)
B29C 45/14 (2006.01)
B29L 11/00 (2006.01)

(52) U.S. Cl.
CPC ........ B29D 11/00644 (2013.01); G02B 1/043 (2013.01); G02C 7/02 (2013.01); G02C 7/10 (2013.01); G02C 7/12 (2013.01); B29C 45/14811 (2013.01); B29K 2995/0034 (2013.01); B29L 2011/00 (2013.01)

(58) Field of Classification Search
CPC ... G02C 7/02; G02C 7/10; G02C 7/12; B29K 2995/0034; B29L 2011/00
USPC ..................................................... 359/488.01
See application file for complete search history.

(56) References Cited

U.S. PATENT DOCUMENTS

| | | | |
|---|---|---|---|
| 5,434,707 A | 7/1995 | Dalzell et al. | |
| 5,922,246 A | 7/1999 | Matsushita et al. | |
| 6,177,032 B1 * | 1/2001 | Smith ............... | B29D 11/0073 264/1.32 |
| 6,328,446 B1 | 12/2001 | Bhalakia et al. | |
| 6,334,680 B1 | 1/2002 | Larson | |
| 6,650,473 B2 | 11/2003 | Nakagoshi | |
| 6,807,006 B2 | 10/2004 | Nakagoshi | |
| 8,012,386 B2 | 9/2011 | Clerc | |
| 8,733,929 B2 | 5/2014 | Chiou et al. | |
| 9,229,247 B2 | 1/2016 | Clerc et al. | |
| 2002/0044352 A1 | 4/2002 | Yamamoto et al. | |
| 2003/0052423 A1 | 3/2003 | Gross et al. | |
| 2003/0184863 A1 | 10/2003 | Nakagoshi | |
| 2004/0223221 A1 | 11/2004 | Sugimura et al. | |
| 2007/0076166 A1 | 4/2007 | Kobuchi et al. | |
| 2008/0062378 A1 * | 3/2008 | McCracken ............. | G02C 7/10 351/57 |
| 2008/0231795 A1 | 9/2008 | Cartier | |
| 2008/0291394 A1 | 11/2008 | Ishak | |
| 2010/0149483 A1 | 6/2010 | Chiavetta, III | |
| 2011/0063569 A1 | 3/2011 | Miyoshi | |
| 2011/0141432 A1 | 6/2011 | Nesty | |
| 2013/0271725 A1 | 10/2013 | Chiou et al. | |
| 2014/0233105 A1 | 8/2014 | Schmeder et al. | |
| 2014/0334000 A1 | 11/2014 | Clerc et al. | |
| 2015/0029586 A1 | 1/2015 | Clerc et al. | |
| 2015/0160479 A1 | 6/2015 | Ohkubo et al. | |
| 2016/0041408 A1 | 2/2016 | Carlson et al. | |
| 2016/0223838 A1 | 8/2016 | Martins et al. | |

FOREIGN PATENT DOCUMENTS

| | | |
|---|---|---|
| EP | 1 607 203 A1 | 12/2005 |
| EP | 1 804 088 A1 | 7/2007 |
| EP | 2 602 655 A1 | 6/2013 |
| FR | 2 990 774 A1 | 11/2013 |
| WO | WO 2004/059370 | 7/2004 |

OTHER PUBLICATIONS

International Search Report of the ISA for PCT/EP2012/067231 dated Oct. 23, 2012; 6 Pages.
PCT International Search Report of the ISA with English Language Translation for PCT/EP2012/067231 dated Oct. 23, 2012; 6 pages.
Translation of Written Opinion for PCT/EP2012/067231; 7 pages.
PCT International Search Report of the ISA for PCT/EP2013/054666 dated Jun. 3, 2013; 5 pages.
Translation of Written Opinion for PCT/EP2013/054666; 8 pages.
PCT International Search Report and Written Opinion of the ISA dated Jun. 5, 2013 for PCT/EP2013/054663; 8 pages.
Notice of Allowance dated Oct. 5, 2015 for U.S. Appl. No. 14/383,232; 12 pages.
Amendment Under 37 C.F.R. §1.312 Filed Dec. 3, 2015 for U.S. Appl. No. 14/383,232; 10 pages.
Application as filed on Feb. 1, 2016 for U.S. Appl. No. 15/012,241, 22 pages.
Office Action dated May 3, 2016 for U.S. Appl. No. 15/012,241; 18 pages.
International Standard; ISO 12312-1; Eye and Face Protection—Sunglasses and Related Eyewear; Part 1—Sunglasses for General Use; ISO 12312-1:2013(E); First Edition; Aug. 2013; Web. Apr. 20, 2016; 4 pages.
Chinese Office Action with English Translations of Chinese Appl. No. 201280054459.9 dated Oct. 30, 2015 and claims as allowed by CPO; 13 pages.
Supplemental Amendment and Response for U.S. Appl. No. 15/012,241 as filed on Jul. 21, 2016; 14 pages.
Final Office Action dated Oct. 19, 2016 for U.S. Appl. No. 15/012,241; 18 pages.
Amendment and Response to Final office Action dated Oct. 19, 2016 for U.S. Appl. No. 15/012,241 as filed on Dec. 16, 2016; 12 pages.
Office Action dated Jul. 27, 2017 for U.S. Appl. No. 15/012,241; 21 pages.
Office Action dated Aug. 7, 2017 for U.S. Appl. No. 14/383,229; 18 pages.
Response to Aug. 7, 2017 Office Action for U.S. Appl. No. 14/383,229 as filed on Oct. 6, 2017; 10 pages.
Response to Office Action dated Jul. 27, 2017 for U.S. Appl. No. 15/012,241; Response filed on Nov. 10, 2017; 13 pages.
Final Office Action dated Feb. 9, 2018 for U.S. Appl. No. 15/012,241; 9 pages.
Response to Final Office Action dated Feb. 9, 2018 for U.S. Appl. No. 15/012,241; Response filed May 1, 2018; 7 pages.
Notice of Allowance dated Dec. 6, 2017 for U.S. Appl. No. 14/383,229; 10 pages.
Restriction Requirement dated Sep. 18, 2015 for U.S. Appl. No. 14/342,927; 7 pages.
Response to Restriction Requirement dated Sep. 18, 2015 for U.S. Appl. No. 14/342,927; Response filed Nov. 5, 2015; 7 pages.
Non-Final Office Action dated Jan. 6, 2016 for U.S. Appl. No. 14/342,927; 13 pages.
Response to Non-Final Office Action dated Jan. 6, 2016 for U.S. Appl. No. 14/342,927; Response filed May 5, 2016; 15 pages.
Final Office Action dated Jun. 17, 2016 for U.S. Appl. No. 14/342,927; 22 pages.
Response to Final Office Action dated Jun. 17, 2016 for U.S. Appl. No. 14/342,927; RCE/Response filed Aug. 17, 2016; 12 pages.
Non-Final Office Action dated Jan. 4, 2017 for U.S. Appl. No. 14/342,927; 21 pages.
Appeal Brief filed Oct. 3, 2017 for U.S. Appl. No. 14/342,927; 33 pages.
Notification of Non-Compliant Appeal Brief dated Oct. 24, 2017 for U.S. Appl. No. 14/342,927; 2 pages.
Response to Notification of Non-Compliant Appeal Brief dated Oct. 24, 2017 for U.S. Appl. No. 14/342,927; Response filed Nov. 2, 2017; 4 pages.

(56) References Cited

OTHER PUBLICATIONS

Notice of Allowance dated Feb. 5, 2018 for U.S. Appl. No. 14/342,927; 10 pages.
U.S. Notice of Allowance dated Sep. 18, 2019 for U.S. Appl. No. 16/115,927; 22 pages.

* cited by examiner

TINTED POLARIZING OPTICAL ELEMENT AND METHOD FOR MANUFACTURING SUCH AN ELEMENT

This application is a divisional application of U.S. patent application Ser. No. 14/342,927 entitled TINTED POLARIZING OPTICAL ELEMENT AND METHOD FOR MANUFACTURING SUCH AN ELEMENT, which was filed on Jun. 13, 2014, and is a National Stage application of PCT Application No. PCT/EP2012/067231 entitled TINTED POLARIZING OPTICAL ELEMENT AND METHOD FOR MANUFACTURING SUCH AN ELEMENT, which was filed in the French language on Sep. 4, 2012, which claims priority to French Application FR1102704 filed on Sep. 6, 2011.

The present invention relates to a tinted polarizing optical element and a method for manufacturing such an element.

The term "optical element" is specifically understood to mean a lens, corrective or otherwise, that can be used as spectacle glass, for spectacles for example, particularly sunglasses, visors or the like.

To date, polarizing assemblies have been known that are formed by two layers of a material, thermoplastic for example, sandwiching a polarizing film, for example a polyvinyl alcohol (PVA) film.

To make a pair of sunglasses without corrective effect, a layer of a thermoplastic material is then injected, polycarbonate for example, on the layer of the polarizing assembly intended to be facing the eye.

The optical element thus formed can already serve, for example, for non-corrective polarizing sunglasses. It is then enough to shape the contour of the optical element to adapt it to the frame.

To obtain semi-finished "glasses", i.e. optical elements of which one can not only shape the outer contour to adapt it to a frame, also called trimming or edging, but of which one can also adapt the optical correction, also called surface finishing, the thickness of the third layer is chosen so that it allows the surface finishing of this "glass" in order to obtain the desired optical correction.

The implementation of such a method for the production of semi-finished "glasses" leads to the production of glasses with a definite tint (generally brown or gray), that is determined by the polarizing element's own tint.

However, it could be desirable to change the tint of the glass, particularly for esthetic reasons, and to do so easily, even for small series.

Known solutions include using a tinted polarizing film, for example. However, these films only exist in a very limited range of tints.

One could envision tinting the third layer of thermoplastic material, which in traditional methods is a layer of "crystal" material, i.e. transparent but untinted.

However, as soon as the surface finishing of the third layer is performed to obtain the desired corrective effect, the tint of the glass is no longer uniform due to this surface finishing step, which will generate variations in thickness.

From document WO0259821 is known an ophthalmic lens that can be tinted. This lens is produced according to a more complicated multi-layered process, with an isotropic base layer, a layer of a polarizing film, a layer of an adhesive film made of polyurethane and a layer of crystal polycarbonate.

According to this document, a colorant can be introduced into the polyurethane adhesive film so as to obtain optical glasses of all colors.

However, it should be noted that the process for manufacturing glasses according to WO0259821 is not an injection method and is very different from that of the Applicant, more complicated and slower. Indeed, the adhesive film plays an important role and requires for its application drying times of at least 30 minutes, then mechanical processing by application of a roller to get rid of any possible air bubbles between the adhesive film and the polarizing film, which could greatly affect the optical quality of the glasses.

The present invention therefore aims to propose a tinted polarizing optical element and a method for manufacturing such an optical element, the tint of which can be chosen very freely, while limiting changes during the manufacturing process, and with a high manufacturing speed.

With this aim, the invention proposes a tinted polarizing optical element, comprising a polarizing assembly consisting of at least a first layer and a second layer of a thermoplastic or thermosetting material sandwiching a polarizing film, characterized in that it furthermore includes a third layer of a tinted thermoplastic material adhering by means of injection to the second layer, and in that it comprises a fourth layer of a crystal thermoplastic material adhering by means of injection to the third layer, intended to be surface finished for a corrective effect.

It is thus possible to twin the advantages of polarizing glasses with the esthetic effects of tinted glasses, while having a high manufacturing speed by means of injection. Indeed, the manufacturing time of a polarizing optical element as defined above is of about 180 s.

Thus, the fourth layer can be surface finished to form a corrective lens without altering the tint or the color of the glass.

Of course, in the present disclosure the term "glass" means glasses essentially made of a thermoplastic material.

It is thus possible to manufacture solar glasses, solar screens, unifocal corrective tinted glasses, and progressive corrective tinted glasses.

According to one aspect, the third tinted layer is produced by a transparent thermoplastic material that is colored by addition of a pigment or a colorant.

According to another aspect, the second layer of thermoplastic material is of an identical chemical nature to the third layer of tinted thermoplastic material, which is itself of an identical chemical nature to the fourth layer of crystal thermoplastic material.

According to another aspect, the polarizing assembly has a thickness comprised between 0.3 mm and 1 mm.

According to another aspect, the third layer has a thickness comprised between 0.5 mm and 2 mm.

The polarizing film is for example a polyvinyl alcohol (PVA) film.

The thermoplastic material is for example comprised in the following group: polymethyl(meth)acrylate, polycarbonate, polycarbonate/polyester blends, polyamide, polyester, cyclic olefin copolymers, polyurethane, polysulfone, TAC (cellulose triacetate) and their combinations.

The thermosetting material for the first and second layers is for example comprised in the following group: CAB (cellulose acetate butyrate).

The invention furthermore relates to a method for manufacturing a tinted optical element as defined above, characterized in that it comprises the following steps:

setting of a polarizing assembly composed of at least a first layer and a second layer of a thermoplastic or thermosetting material sandwiching a polarizing film in a mold of an injection molding machine, injection of a third layer of a tinted thermoplastic material to make it adhere to the second layer, injection of a fourth layer of a crystal thermoplastic material so as to make it adhere to the third layer, the fourth layer being intended to be surface finished for a corrective effect.

Thus, using this method, the layers of the polarizing assembly, the tinted layer and the fourth crystal layer are intimately linked in a simple and easily reproducible way. With this method, it is possible to obtain lenses with a particularly good optical quality, notably by making it possible to limit or even cancel the risk of optical deviation between the layers and to obtain with equal ease small or large series of lenses having a stable tint/color.

According to another aspect, after the injection of the third layer and before the injection of the fourth layer, the mold in which the polarizing assembly and the third layer are found is turned, and the fourth layer of a crystal thermoplastic material is then injected on the third tinted layer.

The invention particularly concerns the use of an optical element as defined above for spectacles, particularly for sunglasses, notably with a corrective effect.

Figure 3:
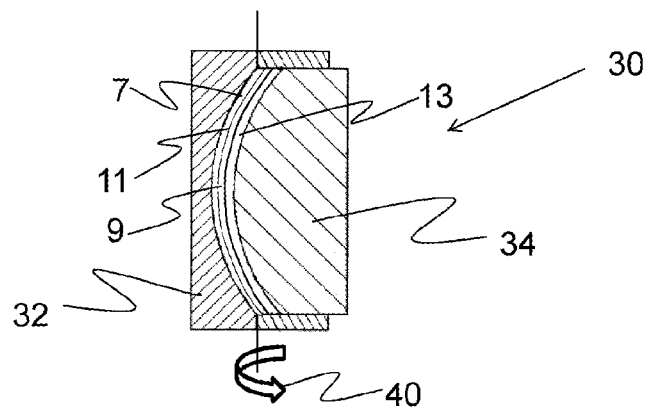
Figure 4:
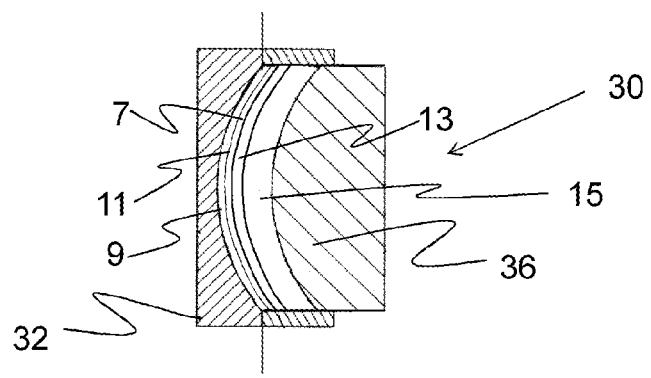

Other advantages and features will become apparent upon reading the description of the following figures, among which:

FIG. 1 shows a schematic section view of an optical element in an intermediate step, FIG. 2 is a schematic section view illustrating the step of molding the third layer of the optical element, FIG. 3 shows a schematic section view of an optical element according to the invention, and FIG. 4 is a schematic section view illustrating the step of molding the fourth layer of the optical element according to the invention.

On all the figures, the same elements bear the same reference numbers.

FIG. 1 shows a schematic section view of a tinted polarizing optical element 1 in an intermediate step.

This tinted polarizing optical element 1 is for example intended to be used for spectacles, particularly sunglasses. To do this it is necessary to only shape the outer contour 3 according to the desired shape of the rim of the frame.

This tinted polarizing optical element 1 comprises a polarizing assembly 5 composed of at least a first layer 7 and a second layer 9 of a thermoplastic or thermosetting material sandwiching a polarizing film 11. Of course, this polarizing assembly 5 with its layers 5, 7 and 9 is optically transparent, i.e. it lets light through.

As can be seen in FIG. 1, the optical element 1 furthermore includes a third layer 13 of a tinted or colored transparent thermoplastic material adhering by means of injection to the second layer 9.

By way of example, the polarizing assembly 5 has a thickness e1 comprised between 0.3 mm and 1 mm and the third layer 13 has a thickness e2 comprised between 0.5 mm and 2 mm.

The polarizing film is for example a polyvinyl alcohol (PVA) film known for its polarizing properties.

For use in spectacles, the layer 13 will be the layer intended to be closest to the eye of the user and the layer 7 to be furthest from the eye of the user.

As evoked above, the two layers 7, 9 can be made of a thermoplastic or thermosetting material, and the layer 13 can be made of a thermoplastic material.

The thermoplastic material can be chosen from the following group: polymethyl(meth)acrylate, polycarbonate, polycarbonate/polyester blends, polyamide, polyester, cyclic olefin copolymers, polyurethane, polysulfone, TAC (cellulose triacetate) and their combinations.

The thermosetting material can be a transparent material such as CAB (cellulose acetate butyrate).

To color the thermoplastic material, it is enough to add pigments or colorants. These can be organic or mineral pigments.

Thus, while having a polarizing optical element, it is possible to easily modify the tint of the latter using a thermoplastic material with a color matching the final tint desired for the layer 13.

Moreover, given that the third layer 13 is applied on the second layer 9 by means of injection, a local phenomenon of fusion is observed at the boundary of the two layers, so that any undesirable refraction phenomena can be avoided. In fact, in a preferred embodiment of the invention, a polarizing assembly 5 will preferably be used comprising a layer 9 particularly able to create this local fusion with the layer of tinted thermoplastic material 13. Advantageously, the layer 9 is a layer of thermoplastic material, and preferably, the layers 9 and 13 are composed of materials of the same chemical family.

Furthermore, by virtue of the design of this optical element the choice of color is no longer limited as previously.

As will be subsequently described, the tinted polarizing optical element 1 in FIG. 1 in an intermediate step is produced in a molding step illustrated schematically in FIG. 2.

Indeed, to produce the optical element 1, one starts from a previously manufactured polarizing insert or wafer formed by the polarizing assembly 5.

The latter is set in an injection molding installation 30 or injection mold comprising a concave mold 32 and two convex molds 34 (FIG. 2) and 36 (FIG. 4).

Advantageously, the concave mold 32 is rotatable and the molds 34 and 36 face each other from either side of the concave mold 32 mounted on its axis of rotation.

The molds are made of polished metal, for example.

Once the polarizing assembly 5 has been set, the third layer 13 of tinted thermoplastic material is injected to make it adhere to the second layer 9.

Thus, the polarizing film 11 being protected and sandwiched between the first 7 and second 9 layers, one is free to choose the thickness of the tinted layer 13 and the concentration of pigments or colorants to obtain the desired tint.

It is therefore understood that the polarizing assembly 5 is manufactured in advance as a polarizing insert or "wafer". On the other hand, on the optical element 1, the layers 7, 9, 13 and the polarizing film 11 form a unit, the assembly 5 can no longer be distinguished as an individual part.

FIG. 3 shows a schematic section view of an optical element according to the invention in the finished state.

With respect to FIG. 1, the optical element 1 furthermore comprises a fourth layer 15 of a crystal thermoplastic material adhering by means of injection to the third layer 13, this fourth layer 15 being intended to be surface finished for a corrective effect.

The terms "crystal" or "crystal glass" are understood to mean a glass/optical material of the class 0 according to the standardized international definition of glasses into five categories of light transmission. It is a glass having in the visible spectrum a light transmission range comprised between 80% and 100%.

In fact, in a preferred embodiment of the invention one will preferably use an optical element 1 comprising a layer 13 particularly suitable for creating this adhesion by means of injection with the layer of crystal thermoplastic material 15.

Advantageously, the layers 13 and 15 are composed of a thermoplastic material belonging to the same chemical family. This can in particular be polycarbonate.

As seen in FIG. 3, the third layer 13 is sandwiched between the second 9 and the fourth layer 15.

Of course, other processing layers can subsequently be applied to the optical element 1, such as layers for anti-reflective, anti-scratch and anti-fouling processes etc.

After the intermediate molding step in FIG. 2, the tinted polarizing optical element 1 in FIG. 3 is produced in an additional molding step illustrated schematically in FIG. 4.

Thus, in addition to that which has been described previously one may now proceed with the injection of the fourth layer 15 of a crystal thermoplastic material so as to make it adhere to the third layer 13 (see FIG. 4), this fourth layer 15 being effectively intended to be surface finished for a corrective effect.

With this aim, after the injection of the layer 13, the mold 34 is withdrawn, the mold of the injection molding machine is turned (see arrow 40—see FIG. 2), then the convex mold 36 is brought forward (see FIG. 4) and then crystal thermoplastic material is injected for the production of the fourth layer 15.

In a preferred embodiment of the invention, the polarizing assembly 5 has a second layer of material 9 of thermoplastic type of an identical chemical nature to the third tinted layer 13, which is itself of an identical chemical nature to the fourth layer 15 of a crystal material. The term "identical chemical nature" is understood to mean a chemical composition that is identical with the exception of the presence or otherwise of a colorant. Indeed, in these conditions the fusion of the thermoplastic materials (i.e. thermoplastic bonding) with each other is all the better when the latter are of an identical chemical nature. Polycarbonate will notably be used as thermoplastic material for all the layers 9, 13 and 15.

Owing to the manufacturing of the optical element by means of injection, the manufacturing speed can be high. The manufacturing of a single optical element only requires about 180 s, by way of indication.

The invention claimed is:

1. A tinted polarizing optical element, comprising:
    a polarizing optical assembly having first and second opposing surfaces, the polarizing optical assembly consisting of:
        a first layer having first and second opposing surfaces, said first layer being provided as a thermoplastic or a thermosetting material;
        a second layer consisting of a polarizing film; and
        a third layer having first and second opposing surfaces, said third layer being provided as a thermoplastic or a thermosetting material, wherein the second layer consisting of the polarizing film is disposed between the second surface of the first layer and the first surface of the third layer, wherein the first surface of the first layer forms the first surface of the polarizing optical assembly and the second surface of the third layer forms the second surface of the polarizing optical assembly; and
    a tinted fourth layer having first and second opposing surfaces, said fourth layer being provided from a tinted thermoplastic material, wherein the first surface of the fourth layer is disposed over the second surface of the polarizing optical assembly such that the tinted fourth thermoplastic material layer is spaced apart from said second polarizing film layer by at least one layer, wherein the fourth layer and the third layer form a thermoplastic bond; and
    a fifth layer having first and second opposing surfaces, said fifth layer being provided from a crystal thermoplastic material, wherein the first surface of the fifth layer is disposed over the second surface of the fourth layer, and the second surface of the fifth layer is provided having a finished surface which provides for a corrective effect, wherein the fifth layer and the fourth layer form a thermoplastic bond.

2. The tinted polarizing optical element of claim 1, wherein the tinted thermoplastic material of the fourth layer comprises a transparent thermoplastic material tinted by addition of a pigment and/or a colorant.

3. The tinted polarizing optical element of claim 1, wherein the tinted thermoplastic material of the fourth layer and the crystal thermoplastic material of the fifth layer comprise a thermoplastic material that is substantially the same as the one or more of the thermoplastic material or the thermosetting material of the third layer with an addition of a pigment and/or a colorant.

4. The tinted polarizing optical element of claim 1, wherein the polarizing optical assembly has a thickness in a range of about 0.3 mm to about 1 mm.

5. The tinted polarizing optical element of claim 1, wherein the fourth layer has a thickness in a range of about 0.5 mm to about 2 mm.

6. The tinted polarizing optical element of claim 5, wherein the thickness of the fourth layer is chosen based on a corrective effect of the fifth layer.

7. The tinted polarizing optical element of claim 1, wherein the polarizing optical assembly is adapted to fit in an optical frame.

8. The tinted polarizing optical element of claim 1, wherein the polarizing film comprises a polyvinyl alcohol (PVA) film.

9. The tinted polarizing optical element of claim 1, wherein the thermoplastic material comprises one or more of: polymethyl(meth)acrylate, polycarbonate, polycarbonate/polyester blends, polyamide, polyester, cyclic olefin copolymers, polyurethane, polysulfone, cellulose triacetate.

10. The tinted polarizing optical element of claim 1, wherein the thermosetting material comprises cellulose acetate butyrate.

11. A tinted polarizing optical element, comprising:
    a pre-manufactured polarizing optical assembly having first and second opposite surfaces, the polarizing optical assembly consisting of:
        a first layer having first and second opposite surfaces, said first layer being provided as a thermoplastic or a thermosetting material;
        a second layer consisting of a polarizing film; and
        a third layer having first and second opposing surfaces, said third layer being provided as a thermoplastic or a thermosetting material, wherein the second layer consisting of the polarizing film is disposed between the second surface of the first layer and the first surface of the third layer, wherein the first surface of the first layer forms the first surface of the polarizing optical assembly and the second surface of the third layer forms the second surface of the polarizing optical assembly; and a fourth layer having first and second opposing surfaces, said fourth layer being provided from a tinted thermoplastic material, wherein the tint of the fourth layer is obtained independently from the polarizing optical assembly and the first surface of the fourth layer is disposed over the second surface of the polarizing optical assembly such that the tinted thermoplastic material is spaced apart from said polarizing film layer by at least one layer, wherein the fourth layer and the third layer form a thermoplastic bond; and a fifth layer having first and second opposing surfaces, said fifth layer being provided from a crystal thermoplastic material, wherein the first surface of the fifth layer is disposed over the second surface of the fourth layer, and the second surface of the fifth layer is provided having a finished surface which provides for a corrective effect, wherein the fifth layer and the fourth layer form a thermoplastic bond.

12. The tinted polarizing optical element of claim 11, wherein the tinted thermoplastic material of the fourth layer comprises a transparent thermoplastic material tinted by addition of a pigment and/or a colorant.

13. The tinted polarizing optical element of claim 11, wherein the tinted thermoplastic material of the fourth layer and the crystal thermoplastic material of the fifth layer comprise a thermoplastic material that is substantially the same as the one or more of the thermoplastic material or the thermosetting material of the third layer with an addition of a pigment and/or a colorant.

14. The tinted polarizing optical element of claim 11, wherein the polarizing optical assembly has a thickness in a range of about 0.3 mm to about 1 mm.

15. The tinted polarizing optical element of claim 11, wherein the fourth layer has a thickness in a range of about 0.5 mm to about 2 mm.

16. The tinted polarizing optical element of claim 15, wherein the thickness of the fourth layer is chosen based on a corrective effect of the fifth layer.

17. The tinted polarizing optical element of claim 11, wherein the polarizing optical assembly is adapted to fit in an optical frame.

18. The tinted polarizing optical element of claim 11, wherein the polarizing film comprises a polyvinyl alcohol (PVA) film.

19. The tinted polarizing optical element of claim 11, wherein the thermoplastic material comprises one or more of: polymethyl(meth)acrylate, polycarbonate, polycarbonate/polyester blends, polyamide, polyester, cyclic olefin copolymers, polyurethane, polysulfone, cellulose triacetate.

20. The tinted polarizing optical element of claim 11, wherein the thermosetting material comprises cellulose acetate butyrate.

21. A tinted polarizing optical element, comprising:
a pre-manufactured polarizing optical assembly having first and second opposite surfaces, the polarizing optical assembly consisting of:
a first layer having first and second opposite surfaces, said first layer being provided as a thermoplastic or a thermosetting material;
a second layer consisting of a polarizing film; and
a third layer having first and second opposing surfaces, said third layer being provided as a thermoplastic or a thermosetting material, wherein the second layer consisting of the polarizing film is disposed between the second surface of the first layer and the first surface of the third layer, wherein the first surface of the first layer forms the first surface of the polarizing optical assembly and the second surface of the third layer forms the second surface of the polarizing optical assembly; and a fourth layer having first and second opposing surfaces, said fourth layer being provided from a tinted thermoplastic material, wherein the fourth layer is injection-molded over the second surface of the pre-manufactured polarizing optical assembly such that the first surface of the fourth layer contacts the second surface of the polarizing optical assembly and such that the tinted thermoplastic material is spaced apart from said polarizing film layer by at least one layer, wherein the fourth layer and the third layer form a thermoplastic bond; and a fifth layer having first and second opposing surfaces, said fifth layer being provided from a crystal thermoplastic material, wherein the fifth layer is injection-molded over the second surface of the fourth layer such that the first surface of the fifth layer contacts the second surface of the fourth layer and the second surface of the fifth layer is provided which can be surfaced finished so as to form a corrective lens without altering the tint or color of the fourth layer, wherein the fifth layer and the fourth layer form a thermoplastic bond.

22. The tinted polarizing optical element of claim 21 wherein the third layer of said polarizing optical assembly layer is provided from a layer of thermoplastic material and wherein first and second layers of polarizing optical assembly are provided from materials of the same chemical family.

* * * * *